Figure 1:
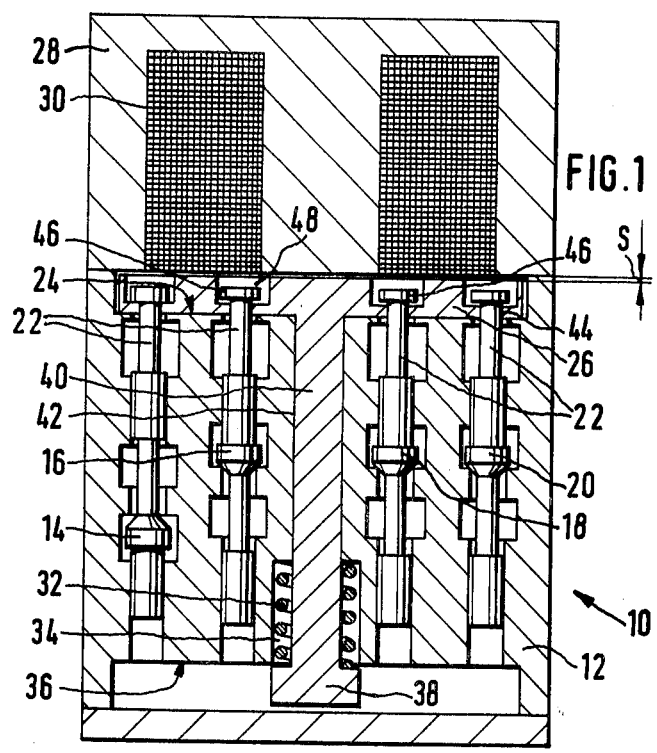

United States Patent [19]

Chromik

[11] 4,151,860

[45] May 1, 1979

[54] ELECTROMAGNETICALLY ACTUATED HYDRAULIC CONTROL VALVE

[75] Inventor: Karel Chromik, Schliern, Switzerland

[73] Assignee: H. Bieri AG Liebefeld, Liebefeld, Köniz, Switzerland

[21] Appl. No.: 835,741

[22] Filed: Sep. 22, 1977

[30] Foreign Application Priority Data

Oct. 18, 1976 [DE] Fed. Rep. of Germany ....... 2646940

[51] Int. Cl.² ...................... F16K 31/06; F15B 13/044
[52] U.S. Cl. ............................... 137/595; 137/596.17; 137/870
[58] Field of Search ................... 137/595, 596.17, 870; 251/137

[56] References Cited

U.S. PATENT DOCUMENTS

| 3,251,378 | 5/1966 | Loveless et al. | 137/596.17 |
| 3,963,048 | 6/1976 | Bowman | 137/596.17 |

Primary Examiner—Gerald A. Michalsky

[57] ABSTRACT

Electromagnetically actuable hydraulic control valve with a valve housing in which a series of valve bodies are disposed in control bores for longitudinal displacement between at least two shift positions, and with a pot electromagnet disposed on the valve housing. The valve has an armature in the form of a large-area, substantially flat plate provided between the pot electromagnet and the valve housing, to which armature at least a part of the valve body ends protruding from the valve housing are attached. The armature plate is provided on its flat side confronting the valve housing with a guide shaft protruding at right angles and guided in a slidingly displaceable manner in a bore in the valve housing.

11 Claims, 3 Drawing Figures

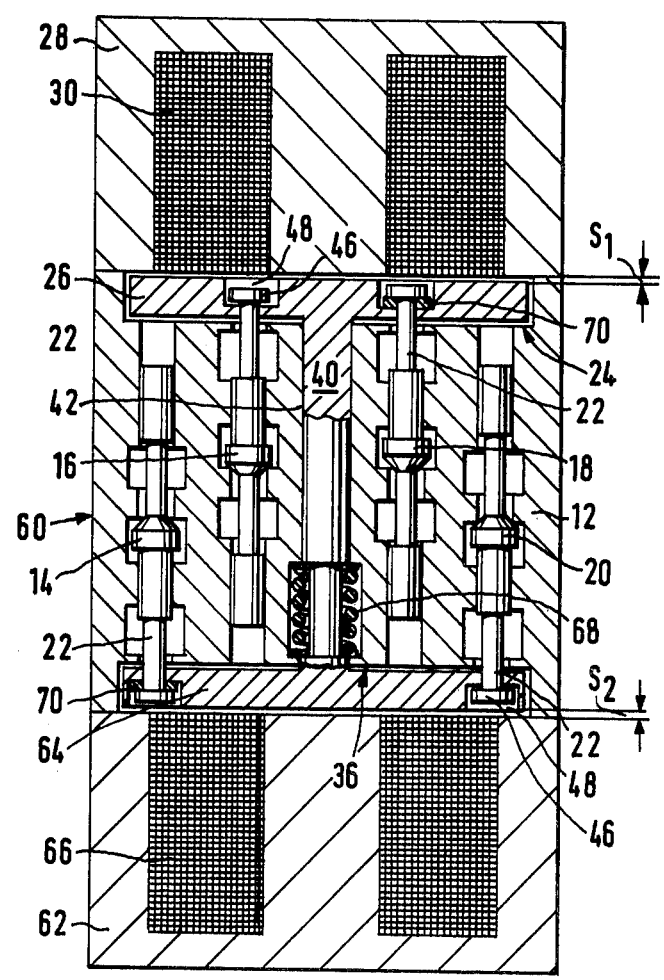

ELECTROMAGNETICALLY ACTUATED HYDRAULIC CONTROL VALVE

BACKGROUND

The invention relates to an electromagnetically operated hydraulic control valve having a valve housing in which a series of valve bodies are disposed for longitudinal displacement in bores between at least two control positions, and having a pot electromagnet disposed on the valve housing and an armature provided between the pot electromagnet and the valve housing in the form of a substantially flat disk to which one or more of the extremities of the valve bodies projecting from the valve housing are attached.

The electromagnetic operation of hydraulic control valves, in which the armature of an actuating electromagnet disposed on the valve housing operates a valve body in the form of a longitudinal slide or "spool", is known, at least one operating electromagnet being associated with each spool when the return of the spool is accomplished by spring power. Also, the arrangement of two electromagnets acting on the opposite ends of the spool is used whenever the return of the spool or its shift to another control position (in the case of a three-position control valve) is accomplished by magnetic actuation. Control valves having complex functions for which a plurality of valve bodies are provided for synchronous actuation are in most cases provided with at least one actuating electromagnet for each valve body or spool, the synchronous actuation being accomplished by the simultaneous energizing of the electromagnets associated with a particular control function. Particularly when the valve control consists of seated valves, which in contrast to the common longitudinal spools cannot easily be combined to form a single valve body by arranging a plurality of seated valves axially in tandem, but must be disposed and actuated separately, the technical expense and the amount of space required is increased by the large number of actuating electromagnets then required. On the other hand, however, seated valves are particularly desirable for use in very high pressure hydraulic control systems, because high-efficiency systems of relatively small dimensions and weights can thus be created.

In a known four-way valve of the kind mentioned in the beginning (U.S. Pat. No. 3,251,378), a reduction of the technical cost is achieved by the fact that, instead of the individual actuating electromagnets associated with each valve body, a single pot electromagnet with a plate-like armature is provided, to which shafts of the two valve bodies extending from the valve housing are connected. In hydraulic control valves of complex functions, in which more than two valve bodies must be operated simultaneously at each stroke, it is important especially in the case of high pressure and very high pressure systems, that the operation of the individual valve bodies, i.e., the opening and the closing thereof, be performed with good synchronism. Even slight timing errors in the opening and closing action of cooperating valve bodies can otherwise—even if the individual valve bodies are carefully relieved of hydraulic pressure—give rise to the development of hydraulic pressure fluctuations and vibrations. Since the plate armature in the known four-way valve is disposed loosely between the valve housing and the pot electromagnet, there is no way of preventing it from tilting slightly due to variations in the resistance of individual valve bodies to shifting, with the result that precisely synchronous actuation cannot be achieved.

THE INVENTION

The invention is addressed to the problem of creating an electromagnetic control for hydraulic control valves of complex function, which can be used even in high pressure and very high pressure systems. At the same time, the technical expense and the cost of the actuating system are to be kept as low as possible.

Setting out from an electromagnetically operated control valve of the kind mentioned in the beginning, this problem is solved in accordance with the invention in that the plate-like armature is provided on its flat side facing the valve housing with a guide shaft guided slidingly in a bore in the valve housing and protruding at a right angle from the said valve housing. This guide shaft assures the precisely parallel guidance and hence the synchronous actuation of all valve bodies connected to the armature. Thus it is now possible to actuate in the manner of the invention control valves which are of very complex design in the number of valve bodies provided in the valve housing and in the manner in which the internal passages in the valve housing are laid out. In particular, it is also possible to design control valves for very high pressure systems using seated valve bodies.

If the function of the control valve requires that, in addition to the valve bodies connected attached the armature, valve bodies which operate contrariwise in the valve housing have to be actuated upon the return stroke and have the extremities by which they are actuated situated at the opposite face of the valve housing, the design can be made such that the guide shaft passes all the way through the valve housing and at the end remote from the armature bears an additional control plate, the space between the armature and the control plate being greater by the stroke length of the armature than the distance between the opposite end faces of the valve housing which are covered by the plates, and that the valve bodies to be actuated contrariwise on the return stroke are attached to the control plate.

The armature plate is preferably biased resiliently to a position in which it is raised from the pot electromagnet, and from which it can be shifted against the action of the resilient force toward the pot electromagnet by the energizing of the latter.

Instead of the resilient return of the armature plate the control plate can be the armature plate of a second pot electromagnet disposed on the side of the valve housing opposite the first pot electromagnet.

The design using two opposite magnets is also suitable for the actuation of a three-position control valve if the two armature plates joined together by the guide shaft are resiliently biased to a middle position in which they are removed from the two pot electromagnets and from which they can be moved towards one or the other of the said pot electromagnets upon the energizing thereof.

The coupling of the valve bodies with their associated armature or control plate is accomplished preferably such that the valve body extremities projecting from the valve housing pass with clearance through a bore in the armature or control plate associated with each and are supported by an end plate of larger diameter on the side of the armature or control plate that is facing away from the valve housing. The armature plate or control plate thus positively drives the valve bodies associated with them in only one direction, while the opposite stroke of the valve bodies is performed by spring return or else by the same kind of hydraulic operation.

In order to prevent the end plates supporting the valve bodies on the armature plate or control plate from projecting beyond the faces of these plates, it is desirable to recess them in countersinks in the associated armature or control plate.

If the control valve of the invention is designed as a three-position control valve with a resiliently determined middle position, the length of the portions of the valve bodies projecting from the valve housing is preferably such that the valve bodies are just in their closed position when the armature plates are in their resilient middle position. The depth of the countersinks for the end plates of the valve bodies will then be equal to or slightly greater than the thickness of the end plates plus the length of the stroke of the valve bodies from the middle position to one end position. Thus it is possible to insert between the end plate of the valve body and the bottom of the countersink a washer whose thickness corresponds to the stroke length without allowing the end plate of the particular valve body to protrude from the armature plate. By the use of such washers, any desired valve bodies can thus be offset from the position in which they are closed with the control valve in the middle position, to the open position, so that the operation of the three-position control valve can be adapted to virtually all possible action requirements merely by the inclusion or omission of these washers.

Figure 2:
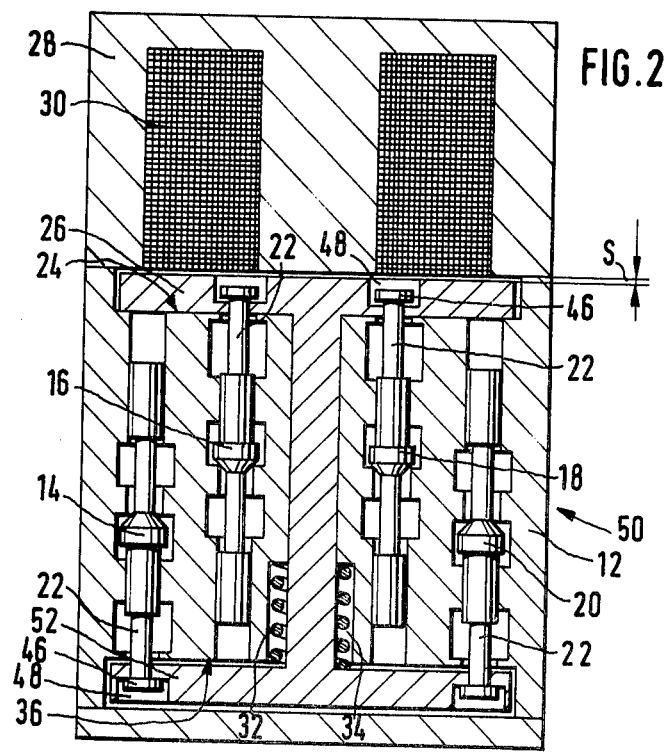

The invention will be further explained in the following description of a number of embodiments thereof, in conjunction with the appended drawing, wherein:

FIG. 1 is a diagrammatic cross-sectional representation of a first embodiment of a two-position control valve in accordance with the invention, FIG. 2 is a cross-sectional representation corresponding to FIG. 1, taken through a second embodiment of a two-position valve in accordance with the invention, and FIG. 3 is a cross-sectional representation corresponding to FIGS. 1 and 2, taken through a three-position control valve in accordance with the invention.

The control valve shown in FIG. 1 and generally identified by the numeral 10 is an electromagnetically actuated hydraulic two-position control valve in whose valve housing 12 a series of valve bodies 14, 16, 18 and 20, which in the present instance are beveled, seated valves, are disposed for longitudinal displacement in a parallel arrangement, each of them controlling the flow of hydraulic fluid between two chambers in the housing 12. In the plane of the cross section four valve bodies are shown, but it is evident that additional valve bodies can be provided in the cutaway portion of the valve housing or in the portion behind the cross-sectional plane. The housing chambers on the inflow and outflow side are connected by passages which are not represented, either with one another or with external circuits, depending on the desired function of the control valve.

Each valve body has an actuating shaft 22 whose free end is brought through the upper face 24 of the valve housing 12 and is connected to an armature plate 26 which forms the armature of an actuating electromagnet constructed in the form of a pot electromagnet 28. The winding 30 of the pot electromagnet 28 can be connected by circuits (not shown) to an electrical power source, whereby the electromagnet 28 is energized and the armature 26 is lifted by the height s. It is apparent that in this case the valve body 14, which in the illustrated position is open, will be closed, while the other initially closed valve bodies 16, 18 and 20 will be opened. It is to be noted that, instead of the arrangement shown, any desired combinations of valve bodies open and closed in the one position can be provided and can be combined with one another.

The restoration of the valve bodies to the starting position after the pot electromagnet 28 is de-energized and the armature 26 drops away, is accomplished by return springs (not shown), by which the individual valve bodies are appropriately biased. The armature plate 26 itself is returned by a coil spring 32 after the pot electromagnet is de-energized. The coil spring 32 lies in a recess 34 in the bottom face 36 of the valve housing, with its inner end engaging the valve housing and its outer end engaging a head 38 of expanded diameter on a guide shaft 40 connected to the armature plate 24 and extending in a slidingly displaceable manner through a matching bore 42 in the valve housing.

The connecting of the actuating shafts 22 of the valve bodies 14 to 20 to the armature plate 26 is accomplished such that each actuating shaft is fitted through a bore 44 in the armature plate 26 and is supported on the armature plate 26 the side facing away from the valve housing 12 by an end plate 46 of larger diameter. Recesses 48 provided on the side opposite the valve housing concentrically with the bores 44 serve to accommodate the end plates 46 so that they do not project above the surface of the armature plate 26 confronting the pot electromagnet.

It is apparent that, if the valve bodies are connected in this manner to the armature plate, they are positively moved only when the armature plate is moved by the excitation of the pot electromagnet, while the return of the valve bodies is accomplished by the return springs described above.

The two-position control valve 50 shown in FIG. 2 is largely the same as the control valve 10 described previously with reference to FIG. 1, corresponding parts of both embodiments being provided with the same reference numbers, so that it will be sufficient to explain hereinafter only the differences, while the description given in conjunction with FIG. 1 can be consulted with regard to the similarities.

The essential difference between control valve 50 and control valve 10 is that the head 38 of control valve 10 is enlarged to form a control plate 52 corresponding in its dimensions to the armature plate 26 and situated beneath the bottom face 36 of the valve housing 12. To this control plate 52 the actuating shafts 22 of valve bodies 14 and 12 provided in valve housing 12 in an inverted arrangement are connected in the same manner as the shafts 22 of the other valve bodies 16 and 18 are connected to the armature plate 26. The actuating shafts 22 thus extend through bores 44 in the armature plate 26 or in the control plate 52 and are held in recesses 48 of plates 26 and 52 by means of end plates 46.

The functional difference between the control valve 50 and control valve 10 is that in the case of the former some of the valve bodies, namely valve bodies 16 and 18, are positively driven by the armature plate 26 upon the energizing of the electromagnet 28, while when the electromagnet is de-energized, the valve bodies 14 and 20 are driven positively and contrariwise by the control plate 52.

Unlike the control valves 10 and 50, the control valve shown in FIG. 3 is a three-position control valve which can be considered as a further development of the two-position valve 50 described in conjunction with FIG. 2. Again in the present case the description will be limited to the differences, and the construction and operation of components identical to those in control valves 10 or 50 can be learned from the description of FIGS. 1 and 2.

It is immediately apparent that the control valve 60 is provided at its bottom end face 36 with a second pot electromagnet 62 operating in the opposite direction to pot electromagnet 28, the control plate provided in the two-position control valve 50 in FIG. 2 being in this case an armature plate 64 whose operation is the same as that of the armature plate 26 of the upper pot electromagnet. When the winding 66 of pot electromagnet 62 is energized, this armature plate 64 is pulled in in the direction opposite that of armature plate 26. Thus, by the alternate energizing of the pot electromagnets 28 and 62, the armature plates 26 and 64 can be actuated to opposite end positions. When both electromagnets are de-energized, the two armature plates at 26 and 64, joined into a single unit by the guide shaft 40 assume a middle position which is imposed upon them by a biased coil spring 68 and which is represented in the drawing. The movements from this middle position are visualized as $s_1$ and $s_2$.

Now, if it is at first assumed that, in the middle position, all of the valve bodies 14 to 20 are in the closed position, the operation of the control valve 60 is such that, upon the energizing of the pot electromagnet 28, the armature plate 26 is pulled in and thus the valve bodies 16 and 18 are opened, while the valve bodies 14 and 20 remain closed. If, vice versa, the pot electromagnet 62 is energized, i.e., if the armature plate 64 is pulled in, the valve bodies 14 and 20 will open, while the valve bodies 16 and 18 remain closed. By a very simple measure, which is represented in the valve bodies 14 and 18, it can nevertheless be brought about that operations can be accomplished in which individual valve bodies are open in the middle position and are closed upon the shift to one end position. This simple measure consists in inserting a washer 70 between the end plate 46 of the valve body that is to be open in the middle position and the bottom of the recess 48 in the armature plate 26 and 64 as the case may be, the thickness of the said washer corresponding precisely to the distance $S_1$ or $S_2$, as the case may be. To prevent the end plates 46 from protruding from the corresponding armature plate 26 or 64 after the insertion of the washer 70, the recesses 48 must be made sufficiently deep, i.e., their depth must be at least equal to the thickness of the end plates plus the length of the stroke from the middle position to one end position.

It is thus apparent that, in accordance with the invention, a three-position control valve is created in which all required functions can be performed by the selective connection of the valve bodies to one of the armature plates 26 or 64 and the insertion of washers 70 between the end plates 46 and the bottom of the corresponding recesses 48, and it is once again pointed out that the control valves of the invention can be provided in practice also with more than the illustrated four valve bodies, so that the possibility is provided of the construction of two-position and three-position control valves of very complex operation.

This is made possible not only by the use of one or two pot electromagnets as the operating magnets permitting the plate-like construction of the armature, which is suitable for the connection of a plurality of synchronously operated valve bodies, but also by the precise guidance of the armature plates to assure the synchronous actuation of all valve bodies.

I claim:

1. Electromagnetically actuable hydraulic control valve, comprising: a valve housing having a bore and two opposite end faces, a series of valve bodies disposed in said valve housing in control bores for longitudinal displacement between at least two shift positions, a pot electromagnet disposed on the valve housing, and an armature in the form of a large-area, substantially flat plate provided between said pot electromagnet and said valve housing, at least a portion of the valve body ends protruding from said valve housing and being operatively connected to said armature plate, said armature plate having on its flat side confronting said valve housing a guide shaft protruding at right angles from said armature plate and slidingly displaceably received and guided in said bore in said valve housing, said guide shaft passing completely through said valve housing, an additional large-area control plate carried by said guide shaft on its end facing away from said armature plate, the distance between said armature plate and said control plate being greater, by an amount corresponding to the throw of the armature plate, then the distance between the opposite end faces of the valve housing which are covered by the respective plate, and additional valve bodies having their ends disposed for longitudinal displacement in said valve housing, said ends of said additional valve bodies protruding from said valve housing and being operatively connected to said control plate.

2. The control valve according to claim 1, wherein said armature plate is biased by a resilient force to a position raised from the pot electromagnet, from which it can be moved toward said electromagnet against the action of said resilient force by energizing of said electromagnet.

3. The control valve according to claim 1, wherein a second pot electromagnet is disposed on the side of said valve housing opposite said first pot electromagnet and wherein said control plate is constructed as an armature plate for said second pot electromagnet.

4. The control valve according to claim 3, wherein said two armature plates joined to said guide shaft are resiliently biased to a middle position raised from both pot electromagnets, from which position they can be moved towards one of said pot electromagnets by energizing of the respective pot electromagnet.

5. The control valve according to claim 4, wherein the length of the portions of the valve bodies protruding from said valve housing is such that the valve bodies are in their closed positions in said middle position of said armature plates.

6. The control valve according to claim 1, wherein each of the ends of said valve bodies protruding from said valve housing passes with clearance through a bore in said armature plate and wherein each of said protruding ends has an end disc for supporting the respective valve body on that side of said armature plate which faces away from said valve housing.

7. The control valve according to claim 6, wherein said end discs are set within counterbores in said armature plate.

8. The control valve according to claim 1, wherein each of the ends of said additional valve bodies protruding from said valve housing passes with clearance through a bore in said control plate and wherein each of said protruding ends has an end disc for supporting the respective valve body on that side of said control plate which faces away from said valve housing.

9. The control valve according to claim 8, wherein said end discs are set within counterbores in said control plate.

10. The control valve according to claim 1, wherein each of the ends of said valve bodies and said additional valve bodies protruding from said valve housing passes with clearance through a bore in said armature and control plate respectively, and wherein each of said protruding ends has an end disc for supporting the respective valve body and additional valve body on that side of said armature and control plate respectively which faces away from said valve housing.

11. The control valve of claim 10, wherein the depth of the counterbores for the end discs of the valve bodies is equal to or slightly larger than the thickness of the respective end disc plus the length of the stroke from said middle position to the respective end position of said armature plate adjacent the respective pot electromagnet.

* * * * *